United States Patent [19]

DeLuca et al.

[11] Patent Number: 4,582,960
[45] Date of Patent: Apr. 15, 1986

[54] SUBSCRIBER NETWORK INTERFACE DEVICE

[75] Inventors: Paul V. DeLuca, Plandome Manor; Peter Hung, Huntington; Helmuth Neuwirth, Garden City, all of N.Y.

[73] Assignee: Porta Systems Corp., Syosset, N.Y.

[21] Appl. No.: 611,217

[22] Filed: May 17, 1984

[51] Int. Cl.⁴ .................... H02B 1/00; H04M 1/24
[52] U.S. Cl. ...................... 179/98; 179/175.3 R; 361/428
[58] Field of Search ............. 179/98, 81 R, 175.1 R, 179/175.3 R, 175.3 F, 175.25; 174/52 R, 59; 361/415, 426, 427, 428; 339/121, 125 R, 126 R, 128

[56] References Cited

U.S. PATENT DOCUMENTS

| | | | |
|---|---|---|---|
| 3,904,839 | 9/1975 | Peoples | 179/175.3 F |
| 4,131,934 | 12/1978 | Becker et al. | 361/428 |
| 4,143,250 | 3/1979 | Simokat | 179/175.3 R |
| 4,176,257 | 11/1979 | DeLuca | 179/98 |
| 4,229,626 | 10/1980 | Peoples | 179/175.3 F |
| 4,242,721 | 12/1980 | Krolak et al. | 361/415 |
| 4,270,030 | 5/1981 | Brolin et al. | 179/175.2 D |
| 4,272,141 | 6/1981 | McKeen et al. | 339/18 R |
| 4,303,296 | 12/1981 | Spaulding | 339/122 R |
| 4,373,121 | 2/1983 | Sartori et al. | 179/175.3 F |
| 4,451,708 | 5/1984 | Kemler et al. | 179/98 |
| 4,470,102 | 9/1984 | DeLuca et al. | 361/428 |
| 4,485,271 | 11/1984 | Norling et al. | 179/19 |
| 4,488,011 | 12/1984 | Rogers | 179/175.11 |
| 4,496,057 | 1/1985 | Zenitani et al. | 211/26 |

Primary Examiner—Gene Z. Rubinson
Assistant Examiner—Elio DiVito
Attorney, Agent, or Firm—Charles E. Temko

[57] ABSTRACT

A subscriber network interface device for multiple subscriber pairs at a common location housed internally in a compact connector block easily mounted upon a wall by screws or a known mounting bracket to eliminate the need for installation of separate one or two line network interface devices. Incoming line connection is made using quick clip elements. Outgoing line connection is made via a female connector which is used to communicate with other quick clips. The circuits are latched in actuated state by the application of a 130 volt direct current applied to the tip or ring side of the line.

5 Claims, 5 Drawing Figures

SUBSCRIBER NETWORK INTERFACE DEVICE

BACKGROUND OF THE INVENTION

This invention relates generally to the field of telephony, and more particularly to an improved multiple pair network interface device suitable for use in business locations and the like, where an individual subscriber requires a large number of subscriber circuits. Devices of this general type are known in the art, and the invention lies in specific constructional details permitting improved facility in installation and operation.

In typical installations in the prior art, fault detection has been directed to trouble fault isolation capability, or line testing ability, since until relatively recently, it has been commonplace for the telephone operating company to own and service all of the equipment involved. With the present trend toward subscriber ownership of on-premises equipment, there arises the need to provide a demarcation point between the telephone company and the subscriber, and to be able to test for disfunction with a view toward locating whether such disfunction is on the telephone company line or the subscriber owned equipment.

In the present state of the art, it is therefore desirable, at least on new installations, to provide network interface devices which are capable of providing minimum test facility which allows the initiation of testing from the telephone central office. Such means preferably include a compact remotely actuated latching structure which will open the individual subscriber pair at the demarcation point, and isolate the testing facility when testing has been completed.

SUMMARY OF THE INVENTION

Briefly stated, the invention contemplates the provision of an improved network interface device capable of interfacing a number of subscriber circuits. Each circuit has a printed circuit card, including a latching device and edge located conductive terminals which connect directly to the inner ends of quick clip terminals connecting the telephone company subscriber lines. A card guide element aligns the interconnecting parts for easy assembly. All of the card guides are mounted in mutually parallel relation in a common housing easily secured to a wall, either directly, or by use of W. E. type 88 mounting housings.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
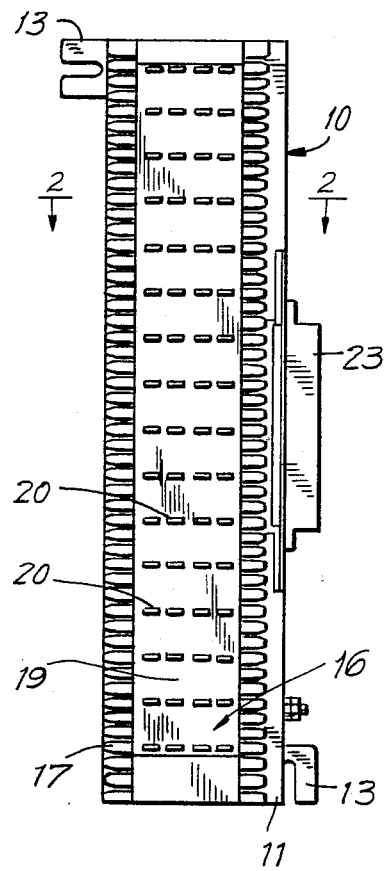
FIG. 1 is a front elevational view of an embodiment of the invention.

In accordance with the invention, the device, generally indicated by reference character 10, comprises an outer housing element 11 including a base 12 having mounting brackets 13 for securing the same to a mounting surface (not shown). Extending outwardly from the base 12 are side walls 14 and 15, supporting an outer wall 15A, in turn mounting a conductor supporting element 16.

The element 16 is preferably of molded synthetic resinous construction, and incorporates index means 17, as well as a centrally disposed recessed area 19 which mounts a plurality of quick clips 20 of well-known type. The outer ends 21 of the clips 20 may include the usual insulation displacement notches for engaging the ends of incoming subscriber pairs. Others of the clips 20 engage outoing pairs, again, as well known in the art. These clips communicate with a female connector 33 at the inner ends 22 thereof.

Disposed immediately beneath the elements 16 are a plurality of card guide elements 30, which are preferably of molded synthetic resinous construction. Each element 30 includes a top wall 31 having a thickened portion 32 provided with guiding bores 33 which accommodate the inner ends of the clips 20. The wall 31 is supported by side walls 34 and 35 having screw means 36 to secure them to the side walls 14 and 15. The inner surfaces of the walls 34–35 are provided with oppositely facing internal grooves 37 for the slidable engagement of individual circuit board card elements generally indicated by reference character 30.

The card elements 40 are, in essence, miniaturized circuit boards each including a mounting surface 41 and bounded by an upper edge 42, side edges 43 and 44, a lower edge 45, a medial edge 46 bordering a ground terminal 48, and a third side edge 49. The upper edge 42 includes a plurality of edge terminals 50 having resilient clip structure 51 adapted to engage the inner ends 22 of the clips 20. This is facilitated by an edge guide member 52 having corresponding bores 53.

Figure 3:
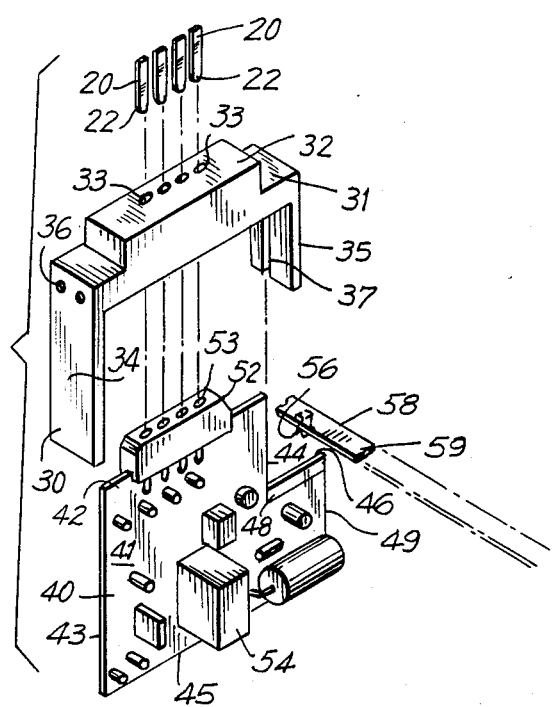
FIG. 3 is an exploded view in perspective of certain of the structure illustrated in FIG. 2.
Figure 5:
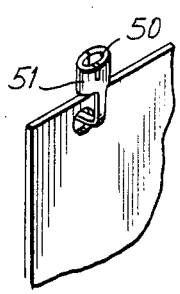
FIG. 5 is a fragmentary enlarged view in perspective corresponding to a left central portion of FIG. 3.

The card elements 40 mount a test circuit 54 (see FIG. 4) normally including a resister and a diode, and interconnected by a solid state latch means 55. An axially oriented ground assembly 58 (FIG. 3) includes a ground bus 59 mounting individual clips 16 which resiliently engage ground terminals 48.

Figure 4:
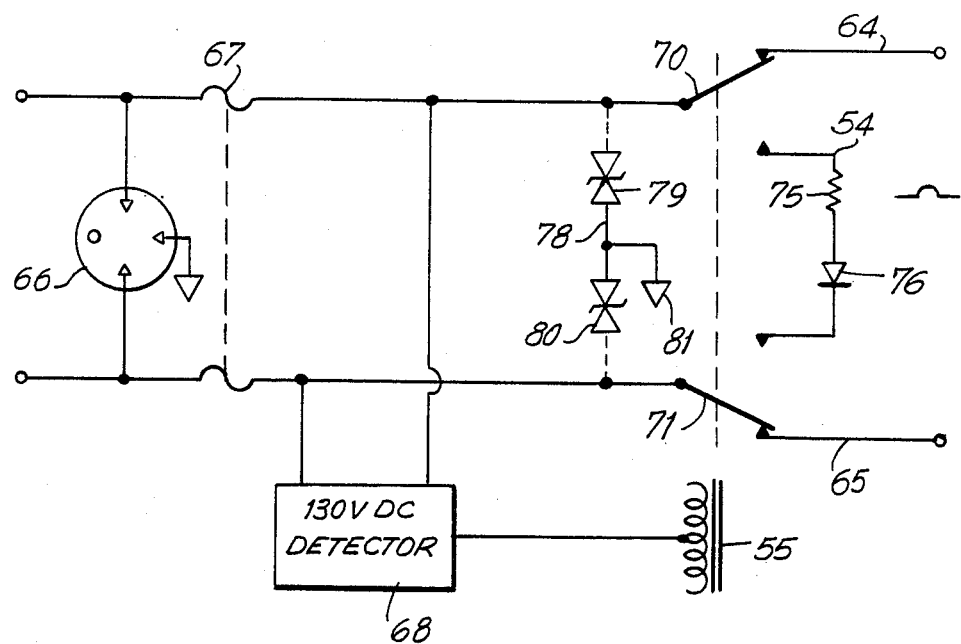
FIG. 4 is an electrical schematic wiring diagram.
Figure 2:
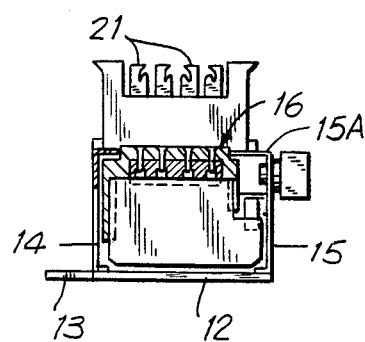
FIG. 2 is a transverse sectional view thereof as seen from the plane 2—2 in FIG. 1.

Referring again to FIG. 4, there is illustrated a telephone operating company subscriber pair 64–65 eminating from an existing entry device 66 which determines a demarcation point. An optional customer reset circuit breaker 67 may be provided, and across the line is a direct current voltage detector 68 which operates the latch means 55. Upon operation, both legs 70 and 71 open the subscriber loop and interconnect the test circuit 54 whereby test procedures initiated at the telephone central office may be performed. The devices are activated (latched in until deactivated) by the application of a 130 volt direct current applied on the tip or ring side of the line. Required application time to ensure latching is three seconds at plus 130 volts and five seconds at plus 120 volts. The termination (signature) measurable from the test location with tip and ring normal is 5 megohms minimum. With tip and ring reversed it is 600 Ohms (nominal), because the circuit is polarized due to the action of the diode 76 in series with the resister 75. In FIG. 4, an optional fast volt protection is also provided of known type, and indicated by reference character 78. It includes a pair of Zener diode 79 and 80 and a ground connection 81.

It may thus be seen that we have invented novel and highly useful improvements in subscriber network interface devices in which there has been provided a means whereby not only can testing procedures initiated by the central telephone office be performed, but because of the presence of a voltage-operated solid state latch, the subscriber loop may be opened at a demarcation point so that tests may be performed on that part of the circuit under the jurisdiction of the central telephone office, thus permitting the location of a fault, as well as its nature. When the relay is unlatched, tests may be also performed which extend to the subscriber owned equipment as well. By providing the test circuitry on a small circuit card associated with each individual subscriber pair, installation of the device is a concomitant of installing the subscriber equipment with very little additional labor.

We wish it to be understood that we do not consider the invention limited to the precise details of structure shown and set forth in this specification, for obvious modifications will occur to those skilled in the art to which the invention pertains.

We claim:

1. An improved telephone subscriber network interface device for use with multiple subscriber pairs interfaced at a single subscriber location comprising: a generally elongated housing element, a connector supporting wall element disposed upon an outer wall of said housing element; a plurality of elongated connector elements carried by said connecter supporting wall element, each forming an outwardly projecting terminal for the interconnection of incoming and outgoing pairs; said connector elements having elongated pin-like inner terminals; a plurality of planar individual circuit cards, one for each subscriber pair, and a generally U-shaped card guide element having means on one member thereof for engaging and guiding said pin-like terminals, and having oppositely disposed grooves on inner surfaces of a pair of other members of said card guide element for the sliding engagement of individual circuit cards in such manner that such pin-like terminals engage conductive terminals on said circuit cards.

2. A network interface device in accordance with claim 1, further characterized in said individual circuit cards having a selectively operative test circuit thereon, and remotely controlled voltage sensitive means for selectively opening individual related subscriber loops for testing and simultaneously interconnecting said loops in series with a respective test circuit.

3. A network interface device in accordance with claim 2, said plurality of circuit cards including a solid state latching relay and a direct current voltage detector controlling said latching relay to open and close a respective subscriber pair loop.

4. A network interface device in accordance with claim 3, further characterized in the provision of a plug-type connector connected directly to outgoing elongated connector elements.

5. A network interface device in accordance with claim 2, in which said elongated connector elements are in the form of quick clip connectors.

* * * * *